US011018570B2

(12) United States Patent
Courcy (10) Patent No.: US 11,018,570 B2
(45) Date of Patent: May 25, 2021

(54) CIRCUIT FOR CONVERTING AN AC OR A DC ELECTRICAL INPUT INTO A DC ELECTRICAL OUTPUT

(71) Applicant: Mania-Tronique 1993 Inc., Rimouski (CA)

(72) Inventor: Claude Courcy, Rimouski (CA)

(73) Assignee: MANIA-TRONIQUE 1993 INC., Rimouski (CA)

( * ) Notice: Subject to any disclaimer, the term of this patent is extended or adjusted under 35 U.S.C. 154(b) by 198 days.

(21) Appl. No.: 16/255,650

(22) Filed: Jan. 23, 2019

(65) Prior Publication Data

US 2019/0252965 A1   Aug. 15, 2019

Related U.S. Application Data

(60) Provisional application No. 62/631,275, filed on Feb. 15, 2018.

(51) Int. Cl.
| | |
|---|---|
| *H02M 1/08* | (2006.01) |
| *H02M 3/335* | (2006.01) |
| *H02J 9/06* | (2006.01) |
| *H02P 7/295* | (2016.01) |
| *H01H 47/32* | (2006.01) |
| *H02H 7/12* | (2006.01) |
| *H02H 1/00* | (2006.01) |
| *H02P 7/03* | (2016.01) |

(Continued)

(52) U.S. Cl.
CPC .......... *H02M 1/08* (2013.01); *H01H 47/325* (2013.01); *H02H 1/0007* (2013.01); *H02H 7/1213* (2013.01); *H02J 9/061* (2013.01); *H02M 1/10* (2013.01); *H02M 3/33507* (2013.01); *H02M 3/33569* (2013.01); *H02P 7/03* (2016.02); *H02P 7/295* (2013.01); *H02M 2001/0006* (2013.01); *H02M 2001/0009* (2013.01); *H02M 2001/0083* (2013.01)

(58) Field of Classification Search
CPC ...... H02M 1/08; H02M 1/10; H02M 3/33507; H02M 3/33569; H02M 2001/0006; H02M 2001/0009; H02M 2001/0083; H02P 7/03; H02P 7/295; H02J 9/061; H02H 7/1213; H02H 1/0007; H01H 47/325
See application file for complete search history.

(56) References Cited

FOREIGN PATENT DOCUMENTS

CN          205792282 U   * 12/2016   .............. H02M 1/08

* cited by examiner

*Primary Examiner* — Matthew V Nguyen
*Assistant Examiner* — Jye-June Lee
(74) *Attorney, Agent, or Firm* — BCF LLP (57) ABSTRACT

A circuit converts an AC or DC electrical input applied between first and second input leads into a DC output applied to a load via first and second output leads. Four thyristors have their anodes respectively connected to one of the first and second input leads or one of the first and second output leads. Cathodes of two thyristors are connected to the first and second output leads while cathodes of two other thyristors are connected to the first and second input leads. Gates of each thyristor are connected to respective unidirectional switches that open and close at the same time. When closed, the unidirectional switches polarize the gates. Thyristors having a positive voltage on their anodes apply this voltage to the first output lead to power the load. Thyristors having a negative voltage on their cathodes transmit return current from the load to the first or second input lead.

15 Claims, 10 Drawing Sheets

(51) Int. Cl.
*H02M 1/10* (2006.01)
*H02M 1/00* (2006.01)

CIRCUIT FOR CONVERTING AN AC OR A DC ELECTRICAL INPUT INTO A DC ELECTRICAL OUTPUT

CROSS-REFERENCE

The present application claims priority to U.S. Provisional Patent Application No. 62/631,275, filed on Feb. 15, 2018, the entirety of which is incorporated herein by reference.

TECHNICAL FIELD

The present disclosure relates to the field of power electronics. More specifically, the present disclosure relates to a circuit for converting an AC or a DC electrical input into a DC electrical output.

BACKGROUND

Electrical power converters are commonly used all types of electrical applications. Many applications require the provision of direct current (DC) voltage. When an electrical grid is not readily available, fuel powered electrical generators may be used.

For example, electromagnets are used in metal recycling plants, commonly called wrecking yards or scrapyards. These magnets are held on vehicle-mounted cranes that travel throughout large fields where metal parts, for example wrecked cars, are stacked on top of one another. Large metal pieces are collected using those magnets. To this end, a magnet is powered with a DC voltage and attracts metal that can be moved around. Cranes on which these magnets are mounted need to move around large fields and, for that reason, cannot usually rely on the electrical grid to provide power. Electrical generators are mounted on the vehicles that support the cranes. DC voltage at a first polarity is used to energize the magnet. Simply removing the DC voltage from the magnet would cause a slow depolarization of the metal attracted by the magnet, the metal remaining attached for several seconds. Usually, a DC voltage of an opposite polarity is provided to the magnet, causing a rapid release of the metal. There is therefore a need for the provision of output power at both opposite polarities at different times.

Alternating current (AC) generators are usually less expensive and require less maintenance than DC generators. The provision of DC voltage when the source is an AC generator requires the use of AC to DC converters.

When DC generators are used, voltage is usually referenced to a neutral, or ground reference, but that is not always the case. A DC generator may provide a positive voltage or a negative voltage on one output lead, and a ground reference on another output lead. Another DC generator may at once provide a positive voltage on one lead and a negative voltage or another lead. DC to DC conversion becomes necessary to ensure that DC power is provided according to the needs of a particular application.

In the field, provision of a DC output voltage converted from any one of a DC or AC input power source may cause challenges and distinct conversion equipment may be used for adaptation to the type of available generator. In the particular case when DC electrical power is provided by a generator, an accidental inversion of leads having positive and negative voltages may lead to the destruction of the converter or to other safety hazards.

Therefore, there is a need for improved power conversion circuits that alleviate or overcome the above described deficiencies.

SUMMARY

According to the present disclosure, there is provided a circuit for converting an electrical input into a DC output, comprising: a first input lead and a second input lead adapted for receiving an electrical input between the first and second input leads, the electrical input being one of a positive DC voltage, a negative DC voltage and an AC voltage; a first output lead and a second output lead adapted for providing the DC output to a load; a first thyristor having an anode connected to the first input lead and a cathode connected to the first output lead; a second thyristor having a cathode connected to the first input lead and an anode connected to the second output lead; a third thyristor having an anode connected to the second input lead and a cathode connected to the first output lead; a fourth thyristor having a cathode connected to the second input lead and an anode connected to the second output lead; a first unidirectional switch connecting the first input lead to a gate of the first thyristor; a second unidirectional switch connecting the second output lead to a gate of the second thyristor; a third unidirectional switch connecting the second input lead to a gate of the third thyristor; a fourth unidirectional switch connecting the second output lead to a gate of the fourth thyristor; and a controller adapted to cause the first, second, third and fourth unidirectional switches to open and close at the same time.

According to the present disclosure, there is also provided the circuit further comprising a fifth thyristor having an anode connected to the second input lead and a cathode connected to the second output lead; a sixth thyristor having a cathode connected to the second input lead and an anode connected to the first output lead; a seventh thyristor having an anode connected to the first input lead and a cathode connected to the second output lead; an eighth thyristor having a cathode connected to the first input lead and an anode connected to the first output lead; a fifth unidirectional switch connecting the second input lead to a gate of the fifth thyristor; a sixth unidirectional switch connecting the first output lead to a gate of the sixth thyristor; a seventh unidirectional switch connecting the first input lead to a gate of the seventh thyristor; and an eighth unidirectional switch connecting the first output lead to a gate of the eighth thyristor; the controller being further adapted to cause the fifth, sixth, seventh and eighth unidirectional switches to open and close at the same time, and prevent concurrent closing of the first and fifth unidirectional switches.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems of providing DC power from various AC or DC sources.

The present disclosure introduces a circuit that converts an electrical input having any polarity, including a positive DC input, a negative DC output, or an AC input, into a DC output at a first polarity. To generate the DC output at the first polarity, the input power is applied via a pair of input leads to a bank of four (4) thyristors that are also connected to a pair of output leads. Four (4) unidirectional switches that are each connected to the gates of a respective one of the four (4) thyristors are closed when a command is received by the circuit for the provision of the DC output at the first polarity. A configuration of the connections between the input leads, the thyristors and their gates, the unidirectional switches and the output leads ensures that DC voltage at the first polarity is present on the output leads when the unidirectional switches are closed. To this end, only two (2) of the four (4) thyristors are placed in conduction, depending on the polarities at the input leads, so that the proper voltage is applied at the output leads.

Optionally, to generate a DC output at a second polarity opposite from the first polarity, the input power may also be applied via the pair of input leads to another bank of four (4) thyristors that are controlled to operate in a reverse fashion. A processor of the circuit ensures that commands for the provision of the DC output at the first and second polarities are mutually exclusive.

In an example application, the DC output at the first polarity is used to activate an electromagnet and DC output at the second polarity is used to briefly deactivate the electromagnet. In another example application, the DC output at the first polarity is used to cause a DC motor to rotate in a first direction and the DC output at the second polarity is used to cause the DC motor to rotate in a second direction, opposite from the first direction.

Figure 1:
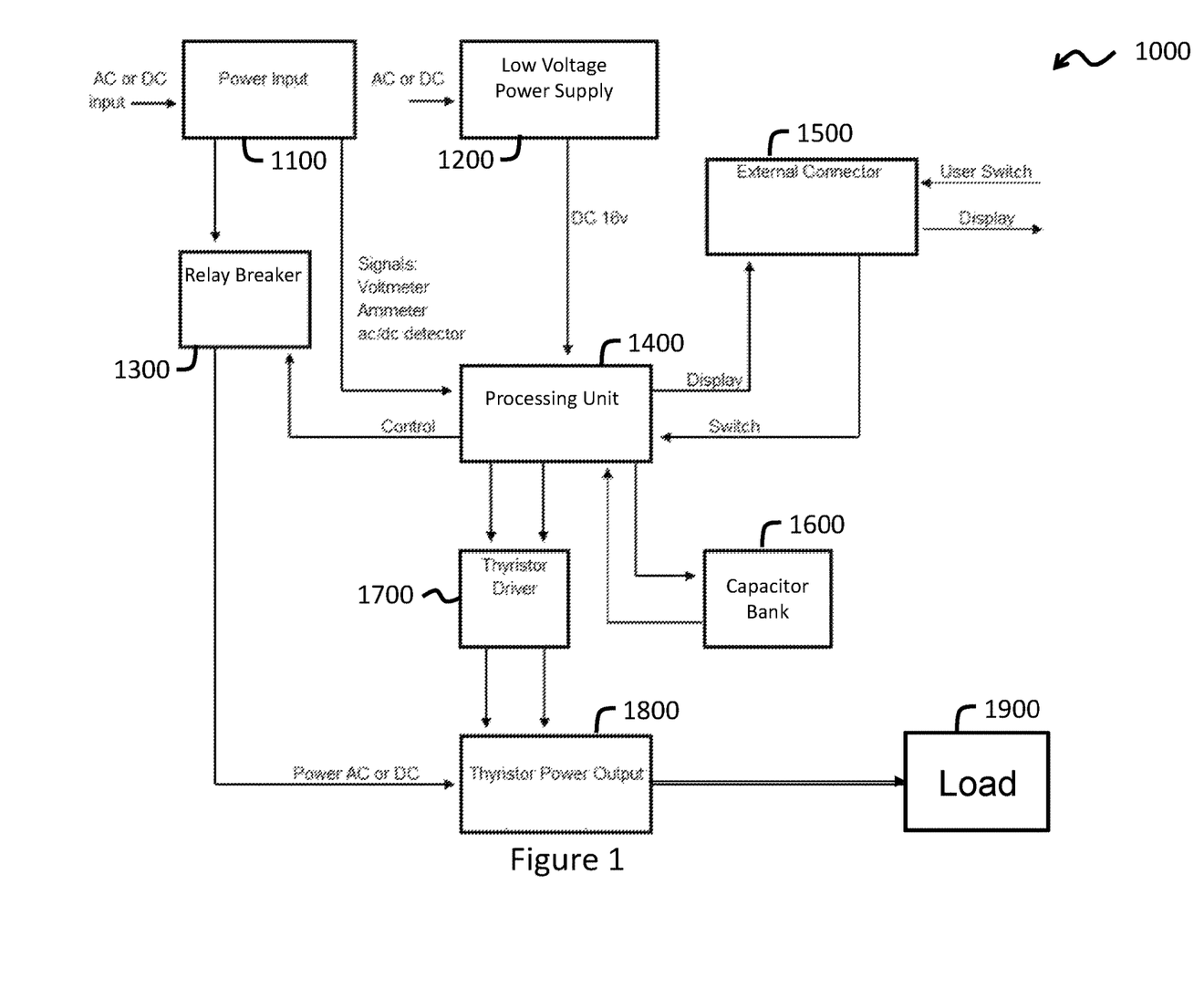
FIG. 1 is a high-level block diagram of a circuit adapted to convert alternative or direct current into a direct current supply according to an embodiment.

Referring now to the drawings, FIG. 1 is a high-level block diagram of a circuit adapted to convert alternative or direct current into a direct current supply according to an embodiment. A circuit 1000 includes a power input module 1100, a low voltage power supply module 1200, a relay breaker 1300, a processing unit 1400, or controller, an external signal connector 1500, a capacitor bank 1600, a thyristor driver unit 1700 and an output power module 1800. A load 1900 receives DC power from the circuit 1000.

Embodiments of the various modules of the circuit 1000 are described in FIGS. 2 to 8. The modules as illustrated implement various features that are specific to a particular application, for example when the load 1900 powered by the circuit 1000 is an electromagnet. The electromagnet is activated when energized at a first DC polarity. When a metallic load is held by the electromagnet, the load itself becomes magnetized. Deactivation of the electromagnet would eventually lead to release of the metallic load after a few seconds. The electromagnet may be deactivated (being in fact activated at a reverse magnetic polarity) when briefly energized at a second, opposite DC polarity, causing a rapid release of the metallic load. Although the examples disclosed herein relate to using the circuit 1000 for activating and deactivating an electromagnet, the circuit 1000 may alternatively be used for driving other loads, for example a DC motor. Distinct DC polarities may be output from the circuit 1000 for rotating the DC motor in forward and reverse directions. A simpler version of the circuit 1000 may output DC power in a single polarity for some applications.

The shown modules implement a variety of timing and protection features that are not directly related to the conversion of AC or DC input power into DC output power. For that reason, some details FIGS. 2 to 9 are not described. The person of ordinary skill in the art of electronic controls and in the art of power electronics will be able to appreciate the use of each component of the illustrated modules.

Figure 2:
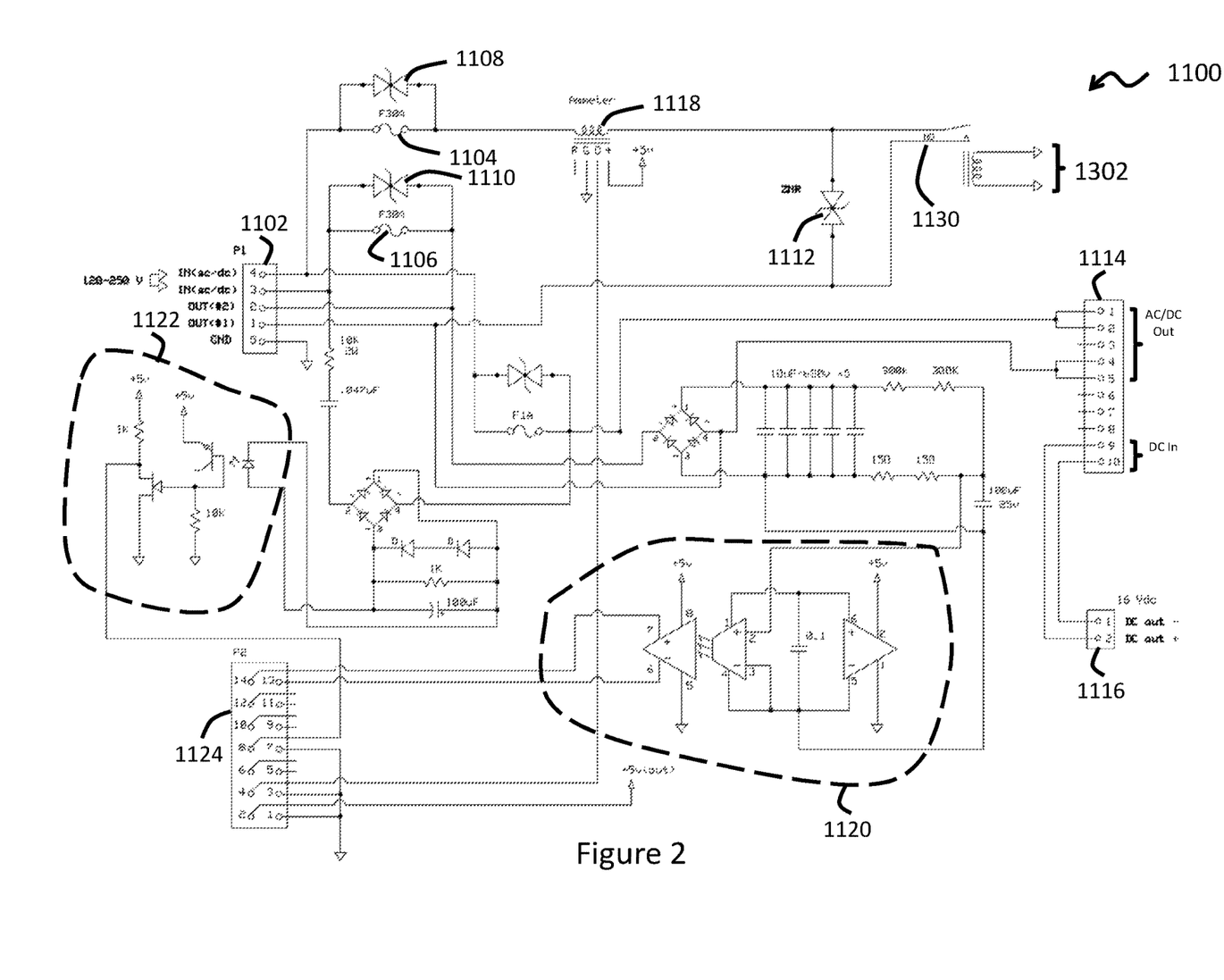
FIG. 2 is a detailed circuit diagram of the power input module of FIG. 1.

FIG. 2 is a detailed circuit diagram of the power input module of FIG. 1. The power input module 1100 includes an external connector 1102 adapted to receive electric power in the form of an AC voltage or in the form of a DC voltage having any polarity. The input may for example have a range of 120 to 500 volts AC or 170 to 700 volts DC, according to the needs of an application for the circuit 1000. Fuses 1104 and 1106 and metal oxide varistors (MOV) diodes 1108, 1110 and 1112 provide overvoltage and overcurrent protection for the circuit 1000. The relay breaker 1300 is also shown on FIG. 2. An input 1302 of the relay breaker 1300 is connected to the processing unit 1400 for control of the breaker 1300. Current flows out of the power input module 1100 and to the power output module 1800 for power delivery, via pins 1,2 of the connector 1102, when the relay breaker 1330 is closed. The voltage from the external connector 1102 is also present on pins 12, and 4,5 of a connector 1114 linked to the low voltage power supply module 1200, for example via a flat cable. The connector 1114 is an internal connector; all connectors mentioned herein are internal to the circuit 1000 unless otherwise mentioned. The low voltage power supply module 1200 returns a 16-volt DC supply received by the power input module 1100 at pins 9,10 of the connector 1114 and fed to the processing unit 1400 via another connector 1116.

An ammeter 1118 measures a current flowing through the power input module 1100 to the relay breaker 1300 and further towards the output power module 1800. A comparator circuit 1120 provides a measurement of the input power voltage. A phase detector 1122 determines whether the input power is in the form or AC or DC current. Current measurement from the ammeter 1118, voltage measurement from the comparator circuit 1120 and AC/DC detection are applied on another connector 1124 that is connected to the processing unit 1400.

Figure 3:
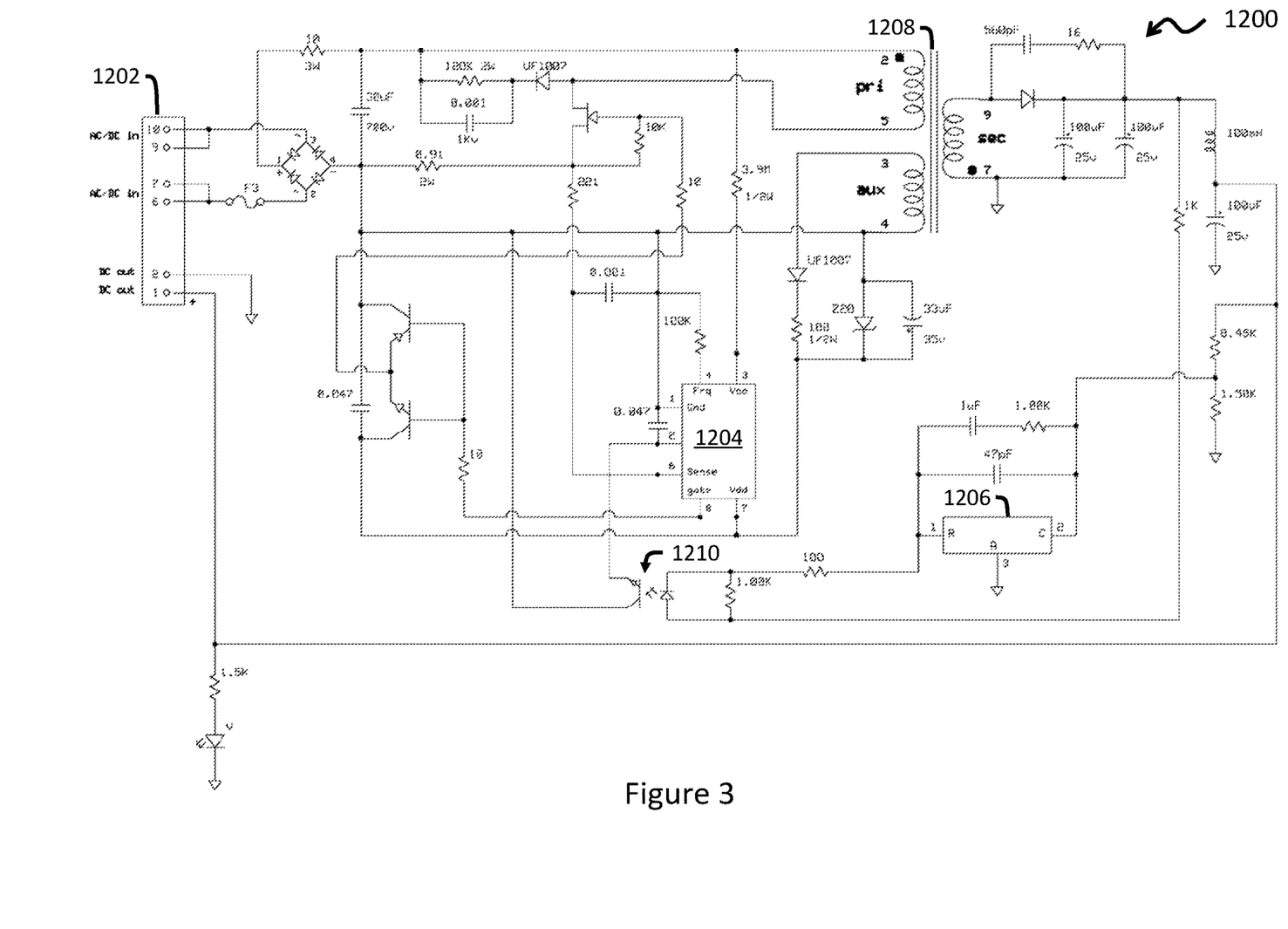
FIG. 3 is a detailed circuit diagram of the low voltage power supply module of FIG. 1.

FIG. 3 is a detailed circuit diagram of the low voltage power supply module of FIG. 1. The low voltage power supply module 1200 includes a connector 1202 linked to the connector 1114 of the power input module 1100. An input AC or DC voltage that may vary over a broad range, for example between +/−120 to 500 volts, is received on pins 6,7 and 9,10 of the connector 1202. The low voltage power supply module 1200 converts this input voltage into a 16-volt DC supply that is applied on pins 1,2 of the connector 1202 for the benefit of the power input module 1100 and of the processing unit 1400. A precise 16-volts output is facilitated in part by the use of a pulse width modulation controller 1204 and of a precision programmable reference unit 1206. A transformer 1208 and an optocoupler 1210 ensure decoupling between the input and output voltages present on the connector 1202. Other components of the low voltage power supply module 1200 are conventional and the skilled reader will be able to reproduce this module or substitute therefor another module having equivalent capabilities. For that reason, they are not described further herein.

Figure 4:
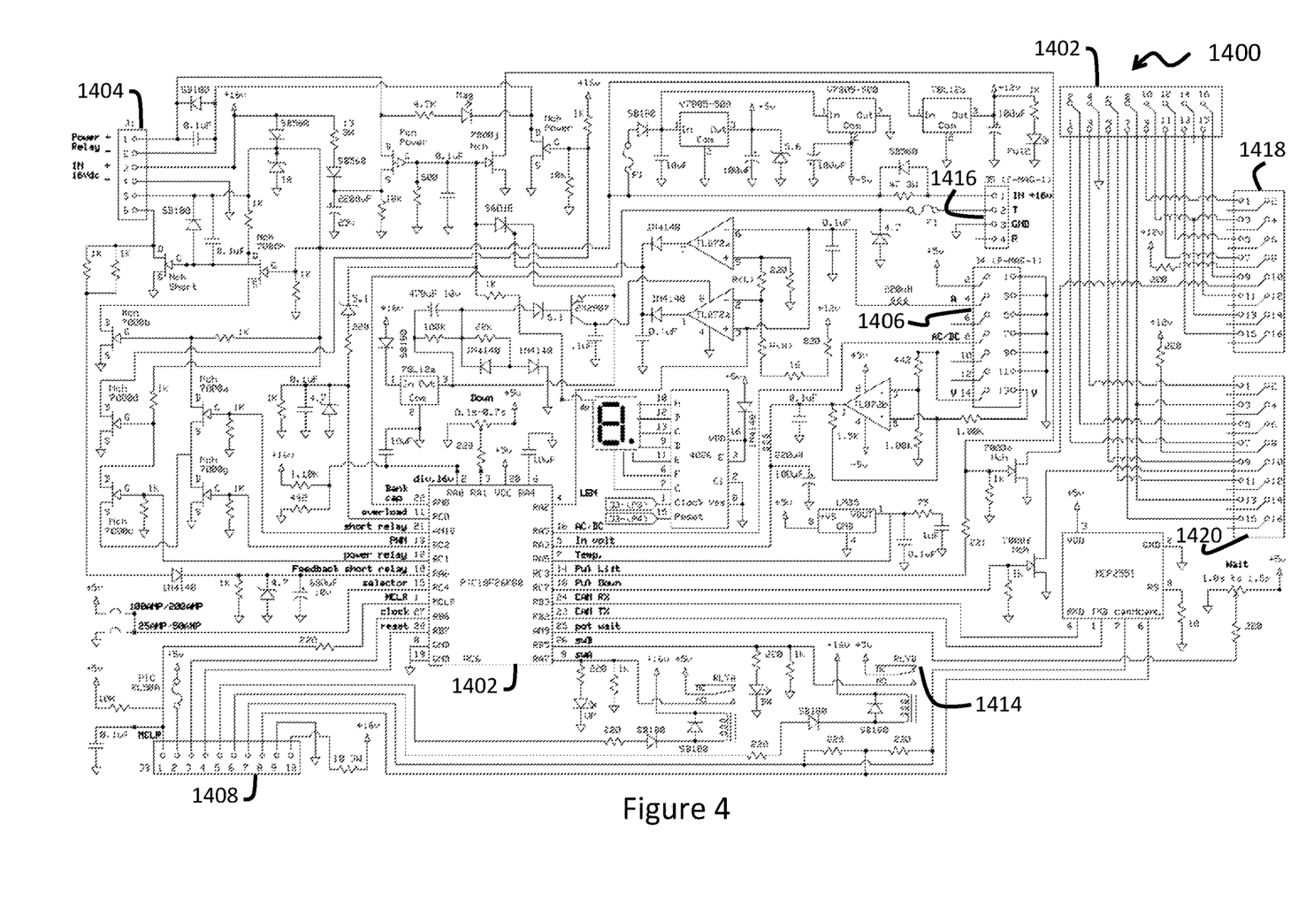
FIG. 4 is a detailed circuit diagram of the processing unit of FIG. 1.

FIG. 4 is a detailed circuit diagram of the processing unit of FIG. 1. Primary functions of the processing unit 1400 are controlled by a microprocessor 1402, which is for example a PIC18F26K20 microprocessor from Microchip Technology Inc. The processing unit 1400 includes six (6) internal connectors used to provide connections, for example using flat cable, to other components of the circuit 1000.

A connector 1404 receives the 16-volt DC supply at pins 3,4 from the connector 1116 of the power input module 1100. The circuit 1400 is powered by this 16-volt DC supply and is therefore independent from the voltage applied at the external connector 1102 of the power input module 1100. The circuit 1400 is also independent from a rated current output of the circuit 1000. Pins 1,2 of the connector 1116 are connected to the output 1302 of the relay breaker 1300. The processing unit 1400 may cause opening of the relay breaker 1300 by sending a command via the pins 1,2 of the connector 1116 in case of a fault. The processing unit 1400 is informed of possible overload of the output power module 1800 via pins 5,6 of the connector 1404.

A connector 1406 is linked to the connector 1124 of the power input module 1100 and receives therefrom the current measurement, the voltage measurement and the AC/DC detection. These measurements are provided to the microprocessor 1402, either directly or through various amplifiers of the processing circuit 1400.

A connector 1408 is linked to the external connector 1500. Depending on external equipment connected to the circuit 1000 via the external connector 1500, the connector 1408 may receive on pins 7,8, from an external terminal having a display, commands that are compliant with a controller area network (CAN) standard. Alternatively, the connector may receive conventional commands on pins 5,6. In the case of CAN-compliant commands, pin 7 is activated when an operator desires to activate an electromagnet powered by the circuit 1000. Pin 8 is activated when the operator desires to deactivate the electromagnet. These commands are applied to a CAN controller 1410, which is for example a MCP2551 from Microchip Technology Inc. The CAN controller 1410 buffers these commands and applies them to the microprocessor 1402. If CAN-compliant commands are not available, pins 5,6 respectively receive activation and deactivation commands that are used to activate a RelayA 1412 or a RelayB 1414. The microprocessor 1402 either treats signals from the CAN controller 1410 or from the RelayA 1412 and RelayB 1414 to control operation of the electromagnet. Pins 1,3,4 of the connector 1408 provide signals that are used for programming of the microprocessor 1402. Pins 2,9,10 of the connector 1408 respectively provide 5-volt DC reference, a ground reference and a 16-volt DC reference to the external connector 1500.

A connector 1416 is linked to the capacitor bank 1600 to temporarily maintain the processing unit 1400 and the thyristor driver unit 1700 energized in case of a loss of input power into the power input module 1100. The processing unit 1400 detects the loss of input power and adapts its control of the circuit 1000 while energized by the capacitor bank 1600. For example, when the load 1900 is an electromagnet, depolarization of the electromagnet at the time of the input power loss causes current to return from the electromagnet to the output power module 1800. The processing unit 1400 then causes the output power module 1800 to dissipate energy returning from the electromagnet.

Connectors 1418 and 1420 are both connected to the thyristor driver unit 1700 and to the output power module 1800. The connector 1418 is used in an implementation to control activation of an electromagnet while the connector 1420 is used to control deactivation of the electromagnet. On the connector 1418, a 12-volt DC feed is applied on pin 8. A "lift" signal to activate the electromagnet is applied on pin 10. The "lift" signal has a voltage lower than 12 volts, for example 0 volt. Signals received from the thyristor driver unit 1700 on pins 1,3,5,7,9,11,13,15 of the connector 1418 are directly forwarded to pins 9,10,12,16,15,10,13 respectively, of a connector 1422 that is linked to the output power module 1800. Pins 3,13 of the connector 1418 are both linked to pin 10 of the connector 1422. On the connector 1420, a 12-volt DC feed is applied on pin 8. A "down" signal to deactivate the electromagnet is applied on pin 10. The "down" signal also has a voltage lower than 12 volts Signals received from the thyristor driver unit 1700 on pins 1,3,5, 7,9,11,13,15 of the connector 1420 are directly forwarded to pins respectively 3,8,2,1,5,6,8,7, of the connector 1422. Pins 3,13 of the connector 1420 are both linked to pin 8 of the connector 1422. How these connections allow control of the thyristor driver unit 1700 and of the 1800 will become apparent in the following description of FIGS. 6, 7 and 9.

Other components of the processing unit 1400 provide various control and protection functions for the circuit 100. The skilled reader will be able to reproduce these functions using the same or components or using components having equivalent capabilities. For that reason, they are not described further.

Figure 5:
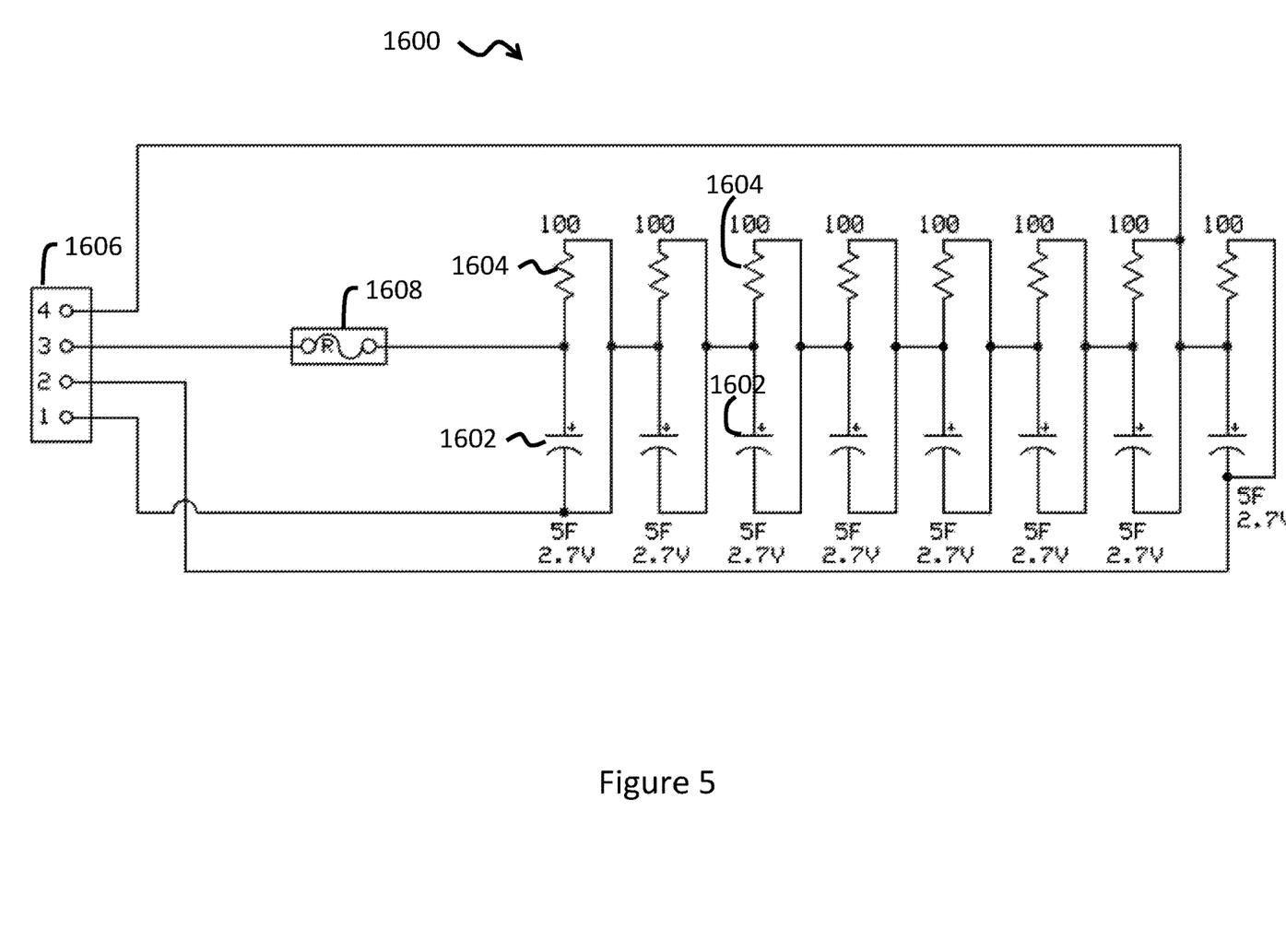
FIG. 5 is a detailed circuit diagram of the capacitor bank of FIG. 1.

FIG. 5 is a detailed circuit diagram of the capacitor bank of FIG. 1. The capacitor bank 1600 comprises a plurality of large capacitors 1602 connected in parallel, with resistors 1604 to prevent overcurrent flowing form the capacitor bank 1600. The capacitor bank 1600 is linked to the connector 1416 of the processing unit 1400 via its own connector 1606. The capacitor bank 1600 is trickle charged by the processing unit 1400 in normal operation. In of a loss of input power, the capacitor bank 1600 provides backup power to the processing unit 1400 for a short period, for example for 30 seconds. A fuse 1608 protects the capacitor bank 1600 from overcurrent.

Figure 6:
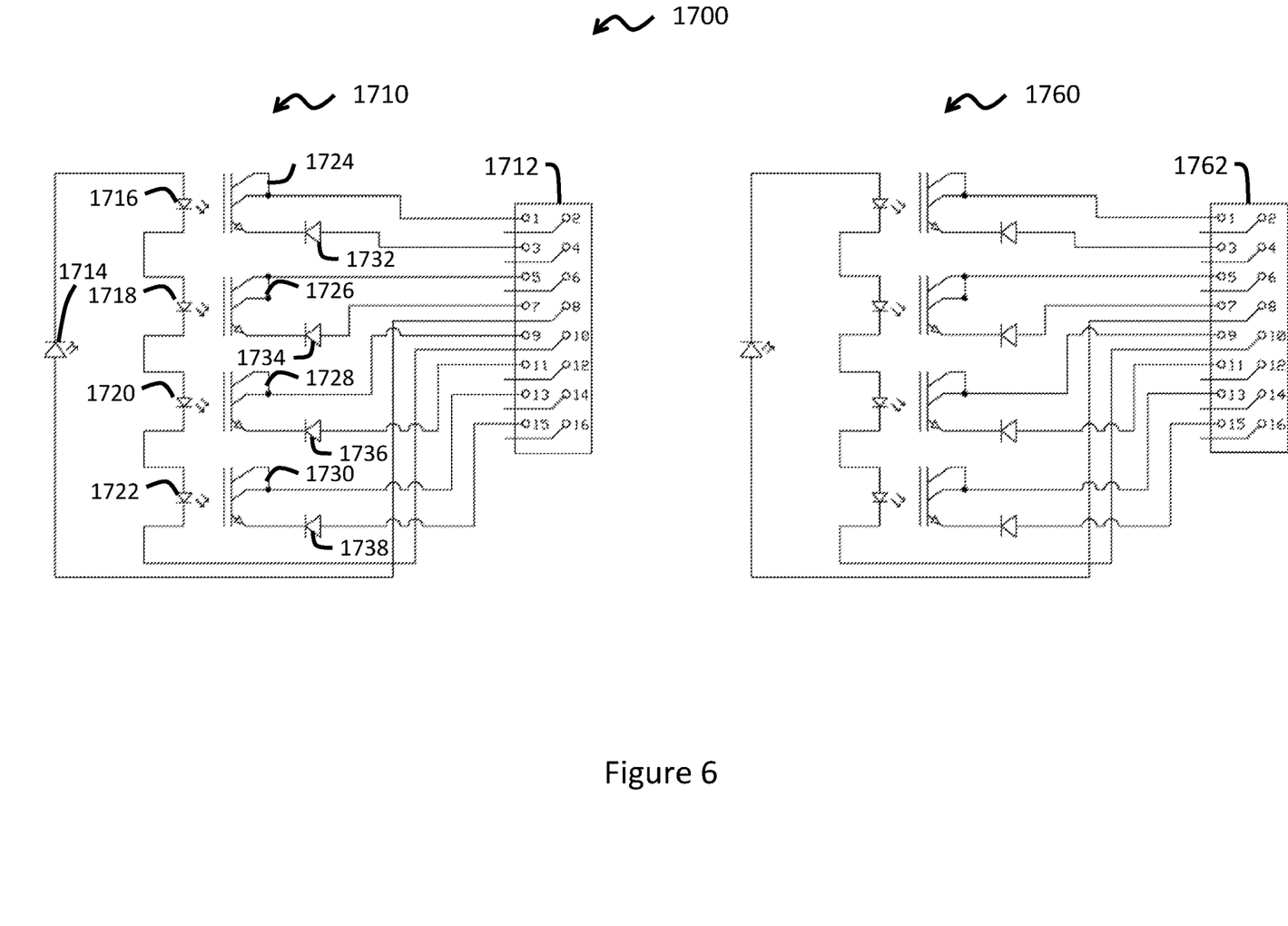
FIG. 6 is a detailed circuit diagram of the thyristor driver unit of FIG. 1.

FIG. 6 is a detailed circuit diagram of the thyristor driver unit of FIG. 1. In the shown embodiment, the thyristor driver unit 1700 comprises two (2) identical driver portions 1710 and 1760. The driver portion 1710 includes a connector 1712 linked to the connector 1418 of the processing unit 1400 and is put in operation when a command to activate the electromagnet is received. The driver portion 1760 includes a connector 1762 linked to the connection 1420 of the processing unit 1400 and is put in operation when a command to deactivate the electromagnet is received. It should be understood that a single driver portion may be used in a circuit used to convert AC or DC power into DC power for applications outputting a single DC power polarity. Because the driver portions 1710 and 1760 are identical in the shown embodiment, only the driver portion 1710 is described in details.

Pins 8,10 of the connector 1712 are respectively linked to the pins 8,10 of the connector 1418. The 12-volt DC feed is applied on pin 8. When the "lift" signal is applied on the pin 10, current flows from the pin 8 through a light emitting diode (LED) 1714 which provides a visible indication that DC power at the first polarity is available. The current also flows through LEDs 1716, 1718, 1720 and 1722 of optocoupled solid state relays (SSR) 1724, 1726, 1728 and 1730, which are respectively connected in series with diodes 1732, 1734, 1736 and 1738. Each pair formed by one of the SSRs 1724, 1726, 1728 and 1730 connected in series with one of the diodes 1732, 1734, 1736 and 1738 forms a respective unidirectional switch that either blocks any current, when open, or allows current to flow in a single direction, when closed.

When current flows through the LEDs 1716, 1718, 1720 and 1722, the SSRs 1724, 1726, 1728 and 1730 become conductive. The diodes 1732, 1734, 1736 and 1738 ensure that Current may only flow through the SSRs when the corresponding diodes are correctly polarized. For example, if the voltage at pin 3 of the connector 1712 is higher than the voltage at pin 1, the diode 1732 and the SSR 1724 become conductive, provided that the SSR 1724 is energized by the LED 1716. Likewise, if the voltage at pin 7 of the connector 1712 is lower than the voltage at pin 5, the diode 1734 blocks any conduction through the SSR 1726, even when SSR 1726 is energized by the LED 1716.

Figure 7:
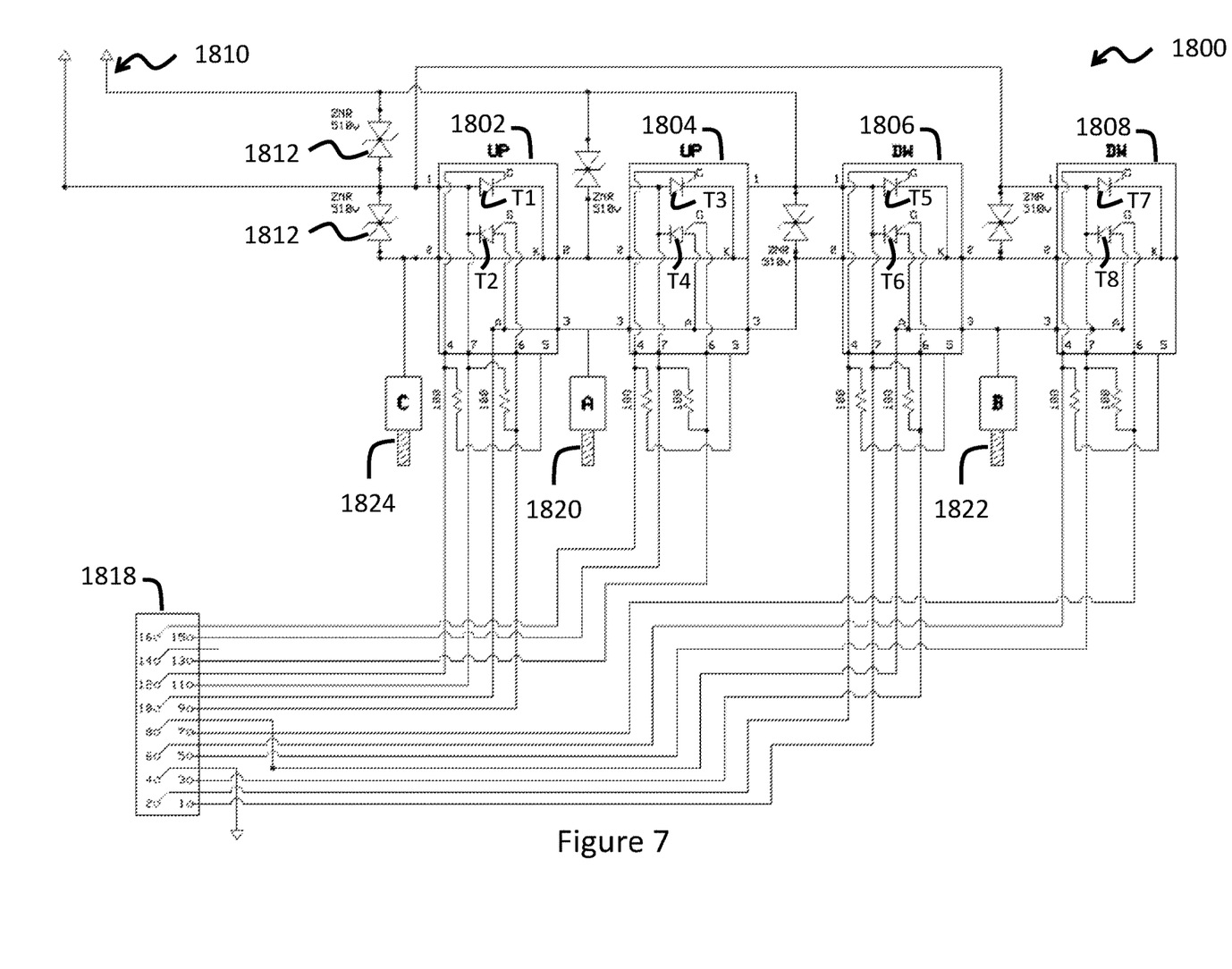
FIG. 7 is a detailed circuit diagram of the thyristor bank in a power output unit of FIG. 1.

FIG. 7 is a detailed circuit diagram of the thyristor bank in a power output unit of FIG. 1. The power output unit 1800 includes four (4) pairs of thyristors forming a thyristor bank. The thyristor bank includes pairs of thyristors 1802 (T1, T2) and 1804 (T3, T4) that output, via output leads 1820, 1822 and 1824, DC power applied at the first polarity to energize the electromagnet when the "lift" signal is received at the processing unit 1400. Pairs of thyristors 1806 (T5, T6) and 1808 (T7, T8) output DC power applied at the second, reverse polarity to briefly de-energize the electromagnet when the "down" signal is received at the processing unit 1400. Instead of the electromagnet, the load attached to the circuit 1000 may include a DC motor. Two (2) pairs of thyristors (T1, T2, T3, T4) may be used if the DC motor is to be operated in a single direction. The four (4) pairs of thyristors may be used when forward and reverse operation of the DC motor is desired.

Leads 1810 are connected to pins 1,2 of the connector 1102 of the power input module 1100 and receive therefrom the input voltage applied at the input power module 1100, provided that the 1300 is not opened and that the fuses 1104, 1106 and that the MOV diodes 1108, 1110 do not detect overcurrent or overvoltage. The input voltage present on the leads 1810 may be in the form of AC voltage or in the form of DC voltage of any polarity.

The input voltage is applied on inputs 1 and 2 of the pairs of thyristors 1802, 1804, 1806 and 1808.

Depending on a polarity of a DC input voltage present on the leads 1810, or depending on an instantaneous polarity of an AC input voltage present on the leads 1810, positive or negative voltages may be present on the inputs 1 and 2 of each pair of thyristors 1802, 1804, 1806 and 1808. Considering the pair of thyristors 1802 and 1804 that are intended to provide a DC output at the first polarity, the input 1 of the pair of thyristors 1802 has an opposite polarity when compared to the input 2 of the pair of thyristors 1804, and vice-versa.

A connector 1818 is linked to the connector 1422 of the processing unit 1400, the connector 1422 being in turn linked to the SSRs 1724, 1726, 1728 1730 of the driver portion 1710 via the connectors 1418 and 1712 and to further SSRs of the driver portion 1760 via the connectors 1420 and 1762.

Figure 8A:
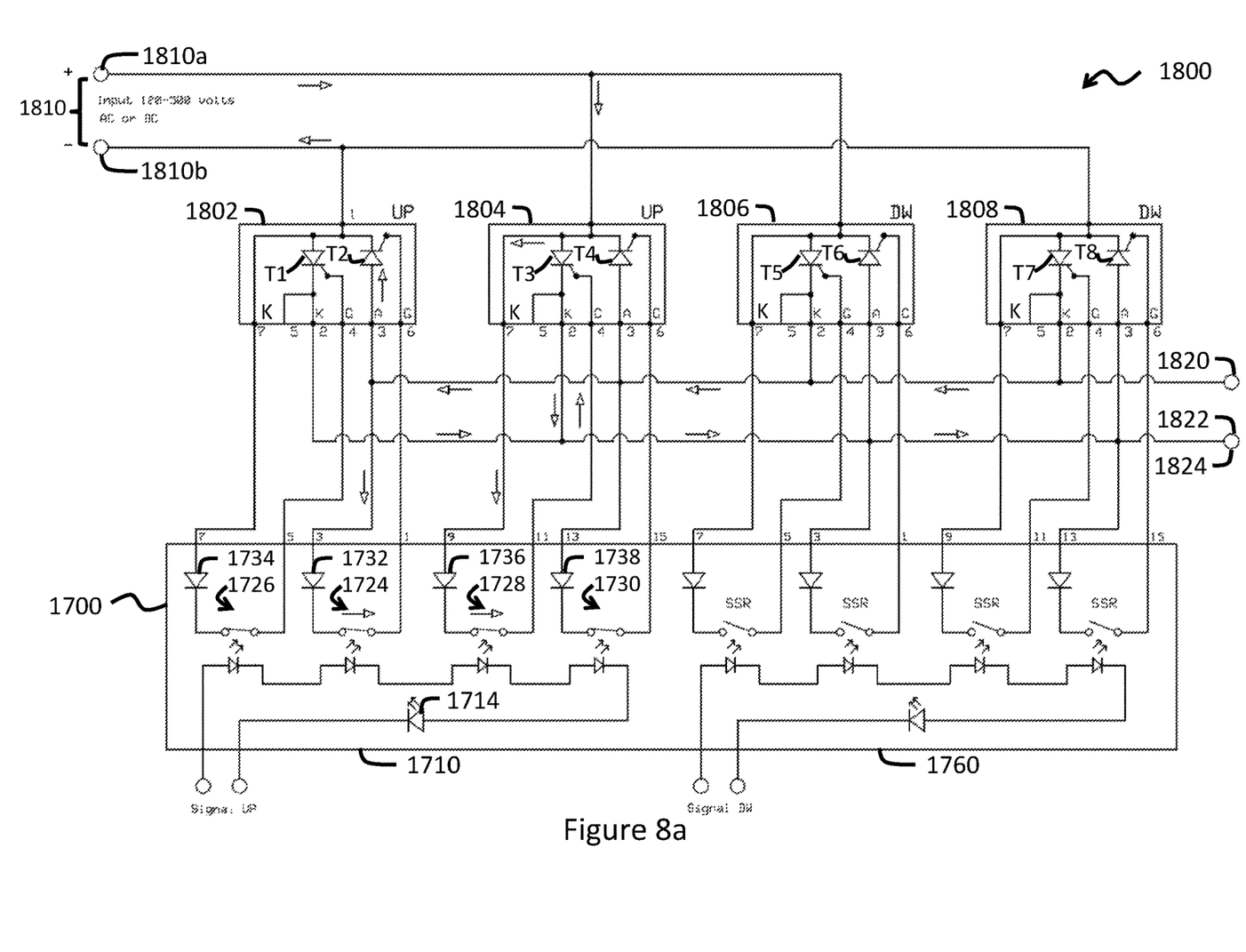
FIGS. 8*a* and 8*b* show a combination of elements of the processing unit, of the thyristor driver unit and of the output power module, different voltages being applied to the output power module on each of FIGS. 8*a* and 8*b*.
Figure 8B:
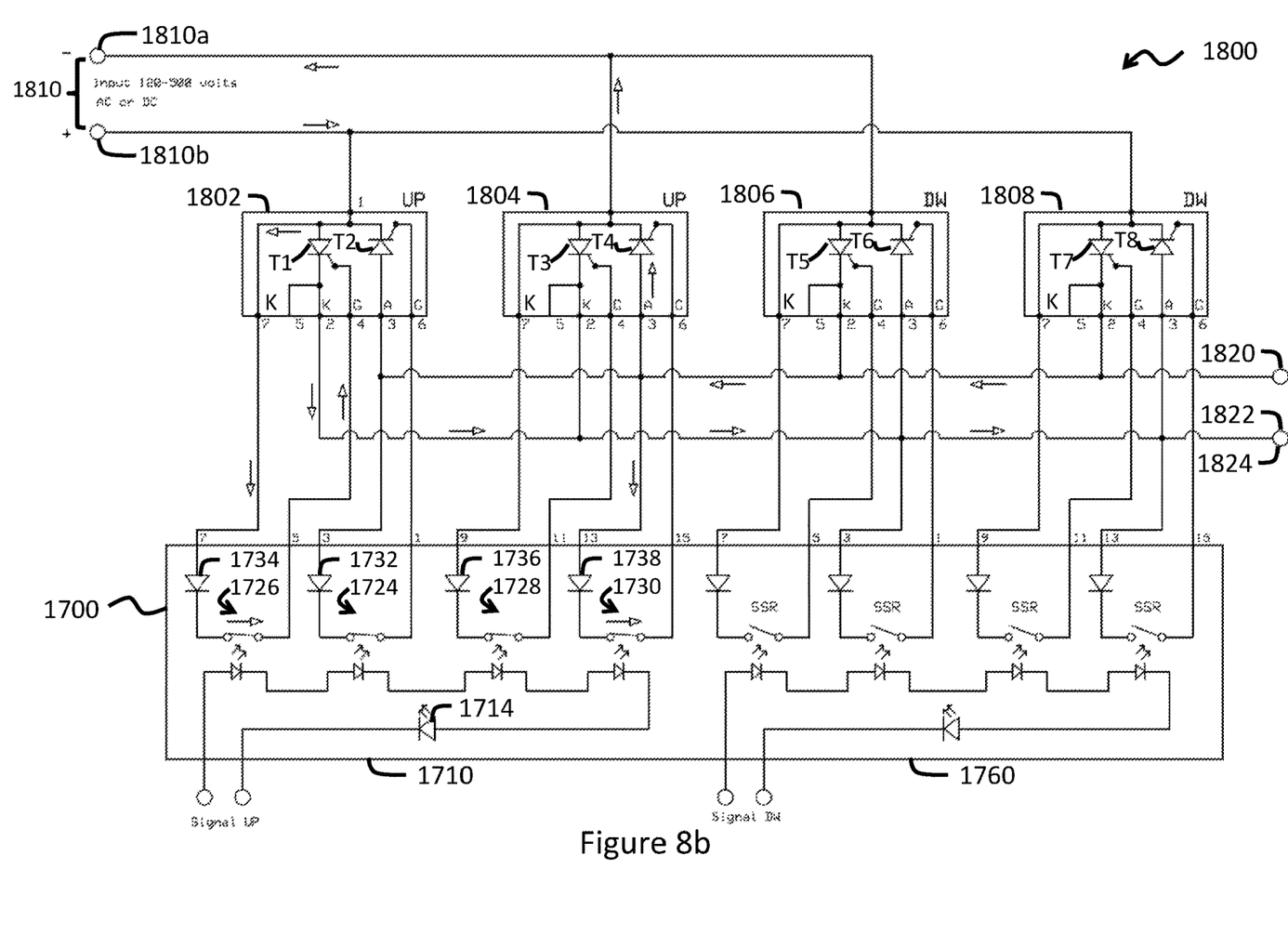

FIGS. 8a and 8b show a combination of elements of the processing unit, of the thyristor driver unit and of the output power module, different voltages being applied to the output power module on each of FIGS. 8a and 8b. The impact of the input voltage on the leads 1810 will only be described for the thyristor pairs 1802 (T1, T2) and 1804 (T3, T4) while a "lift" command is applied on the 1750 to close the SSRs 1724, 1726, 1728 and 1730.

Summarily stated, a first input lead $1810_a$ and a second input lead $1810_b$ are adapted for receiving the electrical input from the power input module 1100, via the relay breaker 1300. The electrical input may be any one of a positive DC voltage, a negative DC voltage and an AC voltage. DC output is provided to the load 1900 between a first output lead 1824 and a second output lead 1820. A first thyristor T1 has an anode (A) connected to the first input lead $1810_a$ and a cathode (K) connected to the first output lead 1824. A second thyristor T2 has a cathode (K) connected to the first input lead $1810_a$ and an anode (A) connected to the second output lead 1820. A third thyristor T3 has an anode (A) connected to the second input lead $1810_b$ and a cathode (K) connected to the first output lead 1824. A fourth thyristor T4 has a cathode (K) connected to the second input lead $1810_b$ and an anode (A) connected to the second output lead 1820. A first unidirectional switch (the diode 1734 and the SSR 1726) connects the first input lead $1810_a$ to a gate (G) of the first thyristor T1. A second unidirectional switch (the diode 1732 and the SSR 1724) connects the second output lead 1820 to a gate (G) of the second thyristor T2. A third unidirectional switch (the diode 1736 and the SSR 1728) connects the second input lead $1810_b$ to a gate (G) of the third thyristor T3. A fourth unidirectional switch (the diode 1738 and the SSR 1730) connects the second output lead 1820 to a gate (G) of the fourth thyristor T4. The processing unit 1400 causes the first, second, third and fourth unidirectional switches to open and close at the same time by applying a difference of potential on pins 8,10 of the connector 1712 of the thyristor driver unit 1700.

Optionally, in the embodiment as shown, a fifth thyristor T5 has an anode connected to the second input lead $1810_b$ and a cathode connected to the second output lead 1820. A sixth thyristor T6 has a cathode connected to the second input lead $1810_b$ and an anode connected to the first output lead 1824. A seventh thyristor T7 has an anode connected to the first input lead $1810_a$ and a cathode connected to the second output lead 1820. An eighth thyristor having a cathode connected to the first input lead $1810_a$ and an anode connected to the first output lead 1824. The thyristors T5, T6, T7 and T8 are respectively connected to four (4) unidirectional switches of the driver portion 1760. The processing unit 1400 causes the unidirectional switches of the driver portion 1760 to open and close at the same time by applying a difference of potential on pins 8,10 of the connector 1762 of the thyristor driver unit 1700. The processing unit 1400 prevents concurrent closing of the unidirectional switches of the distinct driver portions 1710 and 1760.

FIGS. 8a and 8b differ in the polarity of the voltage applied on the leads 1810. On FIG. 8a, a voltage present on the lead $1810_a$ is higher than a voltage present on the lead $1810_b$. For example, the voltage on the lead $1810_b$ may be negative or zero while the voltage in the lead $1810_a$ is greater than zero. The input voltages may be constant (DC) or variable (AC). In the case of an AC voltage, FIG. 8a represents an instant when the voltage at the lead $1810_a$ is higher than the voltage at the lead $1810_b$, while FIG. 8b represents a next instant when the voltage at the lead $1810_a$ is lower than the voltage at the lead $1810_b$.

Considering FIG. 8a initially, the positive voltage from the lead $1810_a$ is applied on the anode of T3, on the cathode of T4 and on the anode of the diode 1736, which becomes conductive. This causes the application of the positive voltage on the gate of T3, which also becomes conductive so that the positive voltage from the lead $1810_a$ is now present on the output lead 1824, which is connected to the load 1900. The output lead 1820 is at a lower voltage than that of the output lead 1824 because it receives current returning from the load 1900. That voltage is applied to the anode of T2 and to the anode of the diode 1732. That voltage is at least marginally higher than the negative voltage from the lead $1810_b$ that is applied on the cathode of T2. This causes the gate of T2 to be polarized via the diode 1732 and the SSR 1724, so T2 becomes conductive. Current returning from the load 1900 via the lead 1820 flows through T2 and returns to the lead $1810_b$.

Considering now FIG. 8b, the positive voltage from the lead $1810_b$ is applied on the anode of T1, on the cathode of T2 and on the anode of the diode 1734, which becomes conductive. This causes the application of the positive voltage on the gate of T1, which also becomes conductive so that the positive voltage from the lead $1810_b$ is now present on the output lead 1824, which is connected to the load 1900. The output lead 1820 is at a lower voltage than that of the output lead 1824 because it receives current returning from the load 1900. That voltage is applied to the anode of T4 and to the anode of the diode 1738. That voltage is at least marginally higher than the negative voltage from the lead $1810_a$ that is applied on the cathode of T4. This causes the gate of T4 to be polarized via the diode 1738 and the SSR 1730, so T4 becomes conductive. Current returning from the load 1900 via the lead 1820 flows through T4 and returns to the lead $1810_a$.

The thyristor pairs 1806 (T5, T6) and 1808 (T7, T8) operate in an equivalent manner to output a negative DC voltage when the "down" command is applied. The voltage is lower at the output lead 1820 than at the output lead 1824 which receives the current returning from the load 1900. The polarity is therefore inversed when compared to the situation of FIGS. 8a and 8b.

Figure 9:
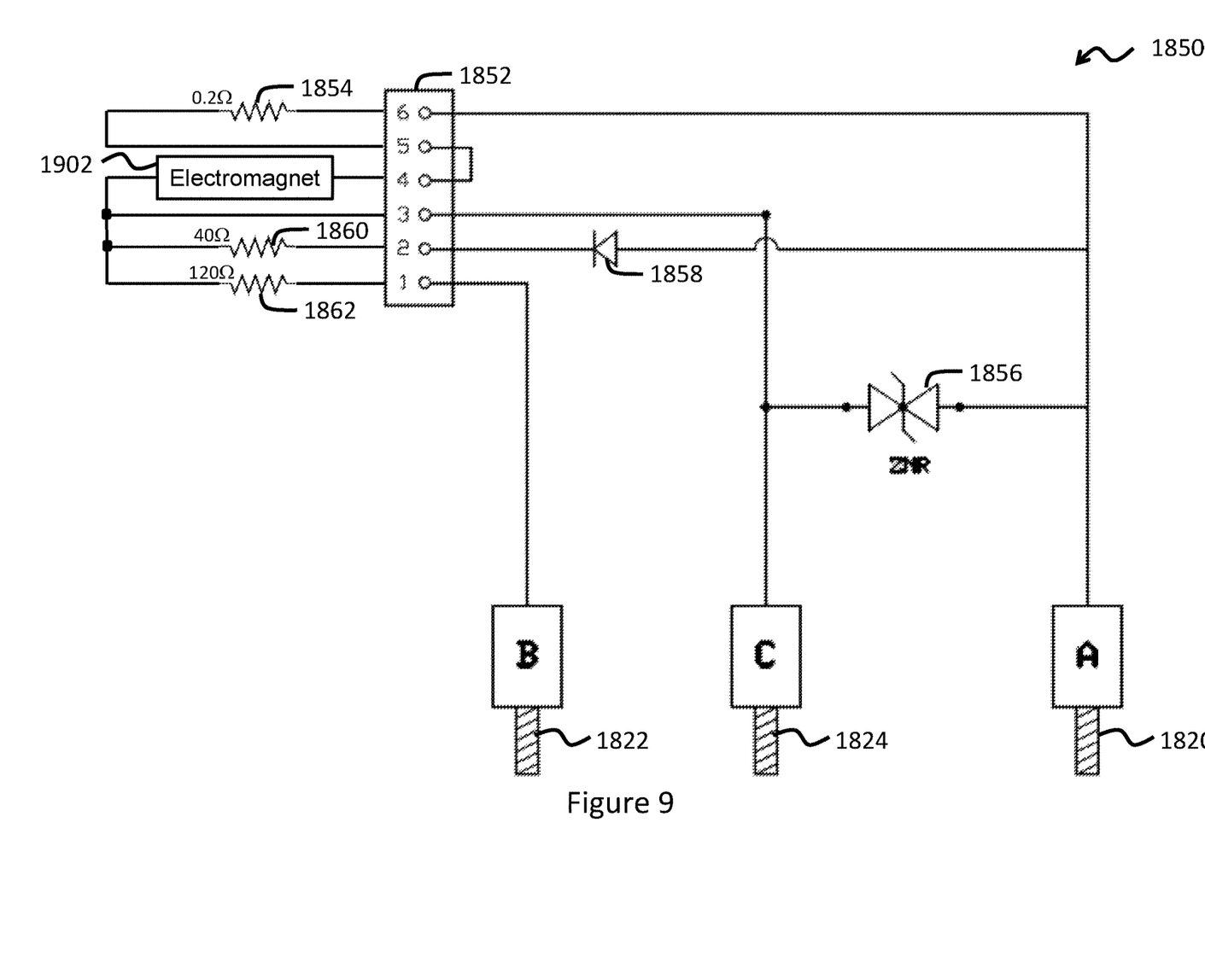
FIG. 9 is a detailed circuit diagram of a final stage of the power output unit of FIG. 1 used to energize an electromagnet.

When the circuit 1000 is used to activate and deactivate an electromagnet, the anodes of T6 and T8 are connected to the output lead 1822 instead of 1824. When the "down" command is applied, the voltage applied to the load by the output lead 1820 is higher than the voltage on the return lead 1822. For example, FIG. 9 is a detailed circuit diagram of a final stage of the power output unit of FIG. 1 used to energize an electromagnet. The leads 1820, 1822 and 1824 shown on FIG. 7 extend to a final stage 1850 that comprises an output connector 1852 for the circuit 1000. When the circuit 1000 outputs DC power at a positive voltage, for example when the "lift" command is applied, the voltage is higher at the output lead 1824 than at the output lead 1820. A positive DC voltage is therefore present on pin 3 of the output connector 1852, pin 6 being negative or neutral. Current flows out of pin 3 of the output connector 1852 and reaches an electromagnet 1902. The current then flows back to the output connector 1852 at pin 4, which is internally connected to pin 5. The current flows out of pin 5 and through a low impedance resistor 1854, for example a 0.2 ohm, 400 watts resistor. The current returns to the lead 1820 via pin 6 of the output connector 1852. A MOV diode 1856 provides further overvoltage protection between the output leads 1824 and 1820.

When the voltage applied between the output leads 1824 and 1820 is released, electromagnetic charges in the electromagnet 1902 are dissipated at least in part in a residual current flowing between the electromagnet 1902, pins 4,5 of the output connector 1852, the resistor 1854, pin 6 of the output connector 1852, a diode 1858, pin 2 of the output connector 1852 and a dissipating resistor 1860, for example a 40 ohms, 50 watts resistor. This manner of dissipating the electromagnetic charges in the electromagnet would take several seconds To deactivate the electromagnet 1902 more rapidly, electric power is applied between the output leads 1822 and 1820, the "down" command being received at the processing unit 1400. At that time, the voltage is higher at the output lead 1820 than at the output lead 1822. Current flows from the lead 1820 to pin 6 of the output connector 1852, the resistor 1854, pins 5,4 of the output connector 1852, the electromagnet 1902, a current limiting resistor 1862, for example a 120 ohms, 250 watts resistor and pin 1 of the output connector 1852 before returning to the lead 1822.

The final stage 1850 of FIG. 9 is specific to the use of the circuit 1000 for activation and deactivation of the electromagnet 1902. To control other types of loads 1900, for example a reversible DC motor, positive or negative DC voltages are simply taken from a pair of leads 1822/1824 and 1820 as illustrated on FIGS. 8a and 8b.

Those of ordinary skill in the art will realize that the description of the circuit for AC or DC to DC conversion are illustrative only and are not intended to be in any way limiting. Other embodiments will readily suggest themselves to such persons with ordinary skill in the art having the benefit of the present disclosure. Furthermore, the disclosed circuit may be customized to offer valuable solutions to existing needs and problems related to conversion of DC or AC electric power into DC power of chosen polarity. In the interest of clarity, not all of the routine features of the implementations of the circuit are shown and described. In particular, combinations of features are not limited to those presented in the foregoing description as combinations of elements listed in the appended claims form an integral part of the present disclosure. It will, of course, be appreciated that in the development of any such actual implementation of the circuit, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of power electronics having the benefit of the present disclosure.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A circuit for converting an electrical input into a DC output, comprising:

a first input lead and a second input lead adapted for receiving an electrical input between the first and second input leads, the electrical input being any one of a positive DC voltage, a negative DC voltage and an AC voltage;
a first output lead and a second output lead adapted for providing the DC output to a load;
a first thyristor having an anode connected to the first input lead and a cathode connected to the first output lead;
a second thyristor having a cathode connected to the first input lead and an anode connected to the second output lead;
a third thyristor having an anode connected to the second input lead and a cathode connected to the first output lead;
a fourth thyristor having a cathode connected to the second input lead and an anode connected to the second output lead;
a first unidirectional switch connecting the first input lead to a gate of the first thyristor;
a second unidirectional switch connecting the second output lead to a gate of the second thyristor;
a third unidirectional switch connecting the second input lead to a gate of the third thyristor;
a fourth unidirectional switch connecting the second output lead to a gate of the fourth thyristor; and
a controller adapted to cause the first, second, third and fourth unidirectional switches to open and close at the same time to provide between the first and second output leads a DC voltage having a first polarity that is independent from a polarity of the electrical input received at the first and second input leads.

2. The circuit of claim 1, further comprising a fifth thyristor having an anode connected to the second input lead and a cathode connected to the second output lead;
a sixth thyristor having a cathode connected to the second input lead and an anode connected to the first output lead;
a seventh thyristor having an anode connected to the first input lead and a cathode connected to the second output lead;
an eighth thyristor having a cathode connected to the first input lead and an anode connected to the first output lead;
a fifth unidirectional switch connecting the second input lead to a gate of the fifth thyristor;
a sixth unidirectional switch connecting the first output lead to a gate of the sixth thyristor;
a seventh unidirectional switch connecting the first input lead to a gate of the seventh thyristor; and
an eighth unidirectional switch connecting the first output lead to a gate of the eighth thyristor;
wherein the controller is further adapted to:
cause the fifth, sixth, seventh and eighth unidirectional switches to open and close at the same time, and
prevent concurrent closing of the first and fifth unidirectional switches.

3. The circuit of claim 2, wherein:
a positive DC voltage is present on the first output lead when the first, second, third and fourth unidirectional switches are closed; and
a negative DC voltage is present on the first output lead when the fifth, sixth, seventh and eighth unidirectional switches are closed.

4. The circuit of claim 2, further comprising a power input module adapted to:
receive the electrical input;
detect a DC or AC nature of the electrical input;
measure a voltage of the electrical input; and
measure a current received from the electrical input.

5. The circuit of claim 4, further comprising a low voltage power supply module adapted electrically connected to the power input module and powered by the electrical input to generate a low voltage DC supply.

6. The circuit of claim 5, wherein the controller is powered by the low voltage DC supply, the controller being further adapted to:
receive from the power input module data including the DC or AC nature of the electrical input, the voltage of the electrical input and the measured current from the electrical input;
receive a command for causing the circuit to output a positive DC voltage or a negative DC voltage;
causing the first, second, third and fourth unidirectional switches to close when the command to output the positive DC voltage is received; and
causing the fifth, sixth, seventh and eighth unidirectional switches to close when the command to output the positive DC voltage is received.

7. The circuit of claim 6, further comprising a relay breaker connecting the power input module to the first and second input leads, the relay breaker being controlled by the controller to cease delivery of DC power from the circuit when a fault is detected by the controller.

8. The circuit of claim 6, further comprising a capacitor bank electrically connected to the controller, the capacitor bank providing backup power to the controller in case of a loss of power on the power input module.

9. The circuit of claim 6, further comprising an external connector operatively connected to the controller for providing the command for causing the circuit to output the positive or negative DC voltage.

10. The circuit of claim 9, wherein:
the command for causing the circuit to output the positive DC voltage is a command to energize an electromagnet powered by the circuit; and
the command for causing the circuit to output the negative DC voltage is a command to de-energize the electromagnet.

11. The circuit of claim 6, wherein the controller is adapted to receive commands that comply with a controller area network (CAN) standard.

12. A reversible DC motor powered by the circuit of claim 2.

13. The circuit of claim 1, further comprising
a third output lead;
a fifth thyristor having an anode connected to the second input lead and a cathode connected to the second output lead;
a sixth thyristor having a cathode connected to the second input lead and an anode connected to the third output lead;
a seventh thyristor having an anode connected to the first input lead and a cathode connected to the second output lead;
and eighth thyristor having a cathode connected to the first input lead and an anode connected to the third output lead;
a fifth unidirectional switch connecting the second input lead to a gate of the fifth thyristor;
a sixth unidirectional switch connecting the third output lead to a gate of the sixth thyristor;

a seventh unidirectional switch connecting the first input lead to a gate of the seventh thyristor; and
an eighth unidirectional switch connecting the third output lead to a gate of the eighth thyristor;
wherein the controller is further adapted for:
  causing the fifth, sixth, seventh and eighth unidirectional switches to open and close at the same time, and
  preventing concurrent closing of the first and fifth unidirectional switches.

14. The circuit of claim 13, wherein:
a positive DC voltage is present on the first output lead when the first, second, third and fourth unidirectional switches are closed; and
a negative DC voltage is present on the third output lead when the fifth, sixth, seventh and eighth unidirectional switches are closed.

15. An electromagnet activated and deactivated by the circuit of claim 13.

* * * * *